(12) United States Patent
Ruhlander

(10) Patent No.: US 7,568,405 B2
(45) Date of Patent: Aug. 4, 2009

(54) GEAR DRIVEN PARKLOCK ASSEMBLY WITH TERMINAL SNAP-FIT HOUSING

(75) Inventor: Gregory Philip Ruhlander, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 729 days.

(21) Appl. No.: 11/114,483

(22) Filed: Apr. 26, 2005

(65) Prior Publication Data

US 2006/0236805 A1    Oct. 26, 2006

(51) Int. Cl.
*F16C 1/22* (2006.01)
*F16C 1/10* (2006.01)
*F16C 1/26* (2006.01)

(52) U.S. Cl. ........... 74/502.6; 74/502.4; 74/500.5

(58) Field of Classification Search ..... 74/502.1–502.6, 74/483 R, 512, 560, 501.5 R, 500.5; 477/96
See application file for complete search history.

(56) References Cited

U.S. PATENT DOCUMENTS

| | | | |
|---|---|---|---|
| 3,439,555 A * | 4/1969 | Rech | 74/502.4 |
| 4,154,124 A * | 5/1979 | Hungerford et al. | 74/502.1 |
| 4,712,397 A | 12/1987 | Niskanen | |
| 4,854,193 A | 8/1989 | Newmann et al. | |
| 4,887,702 A * | 12/1989 | Ratke et al. | 477/96 |
| 5,178,034 A | 1/1993 | Reasoner | |
| 5,199,321 A | 4/1993 | Nowak | |
| 5,317,935 A | 6/1994 | Reasoner | |
| 5,752,414 A * | 5/1998 | Reasoner et al. | 74/483 R |
| 5,875,688 A * | 3/1999 | Porter et al. | 74/512 |
| 6,282,979 B1 | 9/2001 | Meyer | |
| 6,401,565 B1 * | 6/2002 | Wang et al. | 74/502.4 |
| 6,898,996 B2 * | 5/2005 | Freund et al. | 74/560 |

* cited by examiner

*Primary Examiner*—Vinh T. Luong
(74) *Attorney, Agent, or Firm*—Gifford, Krass, Sprinkle, Anderson & Citkowski, P.C.; Kevin S. MacKenzie; Dean B. Watson

(57) ABSTRACT

A motion transmitting remote control cable assembly includes a conduit having first and second ends and a central axis. A core wire is disposed along the central axis of the conduit and includes first and second ends. A slide housing having opposing top and bottom walls, opposing side walls, and opposing first and second ends has a guide passage extending from the first to the second end of the slide housing. A slide member including opposing top and bottom surfaces, opposing side surfaces, and opposing first and second ends is coupled to the core wire at the first end of the core wire. The slide member is disposed within the guide passage and includes notches formed on one of the opposing side surfaces. A gear assembly is rotatably connected to the slide housing and meshes with the notches formed on the slide member. A torsion spring having first and second ends is disposed about the gear assembly and is attached to the gear assembly at the first end of the spring. Additionally, the torsion spring is attached to the slide housing at the second end of the spring for applying a biasing force to the slide member.

16 Claims, 2 Drawing Sheets

GEAR DRIVEN PARKLOCK ASSEMBLY WITH TERMINAL SNAP-FIT HOUSING

FIELD OF THE INVENTION

The invention relates to a motion transmitting remote control cable assembly, and more particularly to a motion transmitting remote control cable assembly for a parklock device.

BACKGROUND OF THE INVENTION

Parklock systems are included in vehicle linking the transmission, ignition and shifter. Generally, the parklock systems include cable assemblies linking the transmission and the shifter. Typically the cable assembly includes a conduit with a core wire disposed along an axis of the conduit. The core wire links the transmission with the shifter assembly.

Prior art parklock designs include various components that engage an element to prevent movement of the shifter assembly. There is therefore a need in the art to further improve such park lock devices eliminating a number of components currently utilized. Additionally, there is a need in the art for a parklock assembly that is preloaded to achieve tension in the core element, reducing the noise and vibration within the cable system. Additionally, there is a need in the art for a parklock assembly that is operated directly from the core wire by a slide mechanism that is formed directly on the core wire.

SUMMARY OF THE INVENTION

A motion transmitting remote control cable assembly includes a conduit having first and second ends and a central axis. A core wire is disposed along the central axis of the conduit and includes first and second ends. A slide housing having opposing top and bottom walls, opposing side walls, and opposing first and second ends has a guide passage extending from the first to the second end of the slide housing. A slide member including opposing top and bottom surfaces, opposing side surfaces, and opposing first and second ends is coupled to the core wire at the first end of the core wire. The slide member is disposed within the guide passage and includes notches formed on one of the opposing side surfaces. A gear assembly is rotatably connected to the slide housing and meshes with the notches formed on the slide member. A torsion spring having first and second ends is disposed about the gear assembly and is attached to the gear assembly at the first end of the spring. Additionally, the torsion spring is attached to the slide housing at the second end of the spring for applying a biasing force to the slide member.

DETAILED DESCRIPTION OF THE PREFERRED EMBODIMENTS

Figure 1:
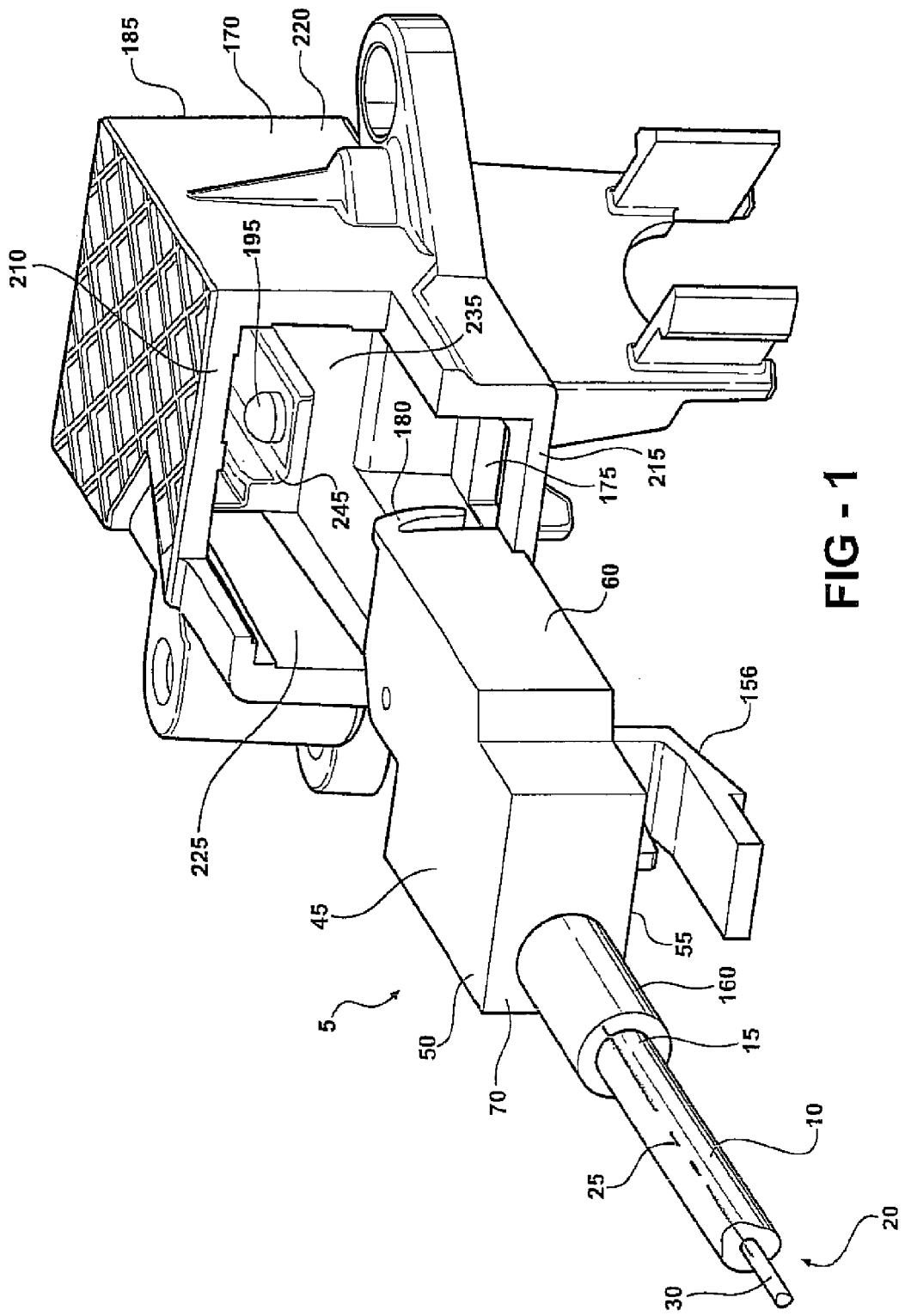
FIG. 1 is a perspective view of a motion transmitting remote control cable assembly and an ignition housing.
Figure 2:
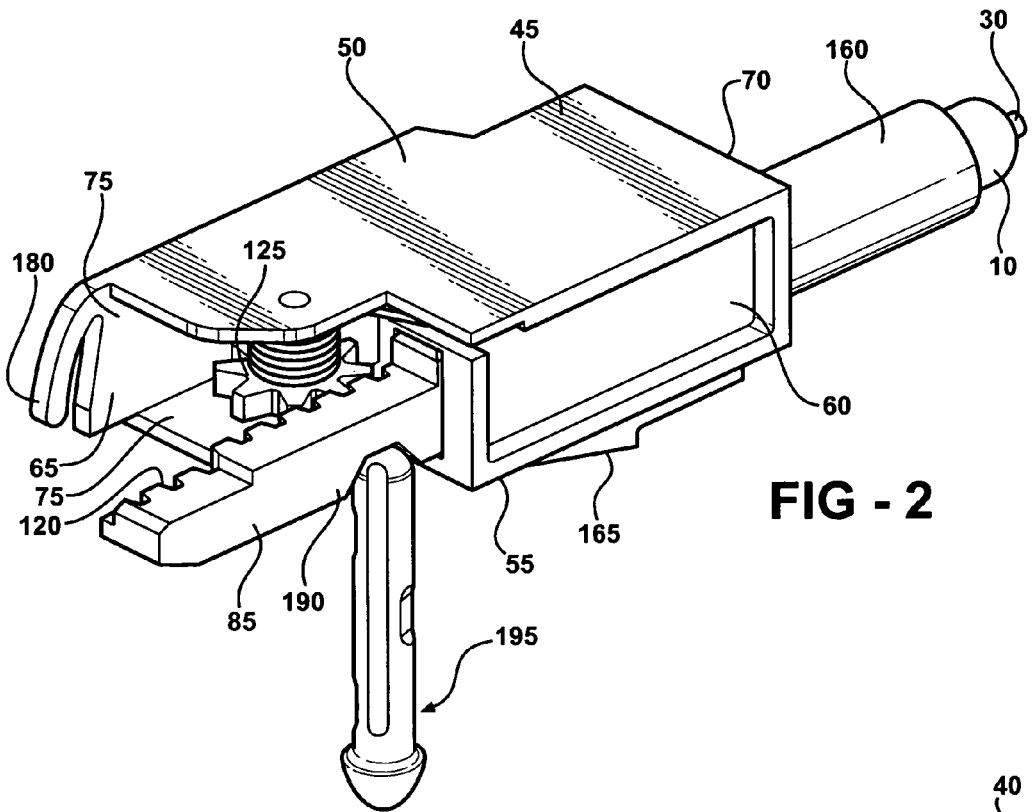
FIG. 2 is a perspective view of a motion transmitting remote control cable assembly including a slide housing and slide member engaging a pin associated with an ignition.
Figure 3:
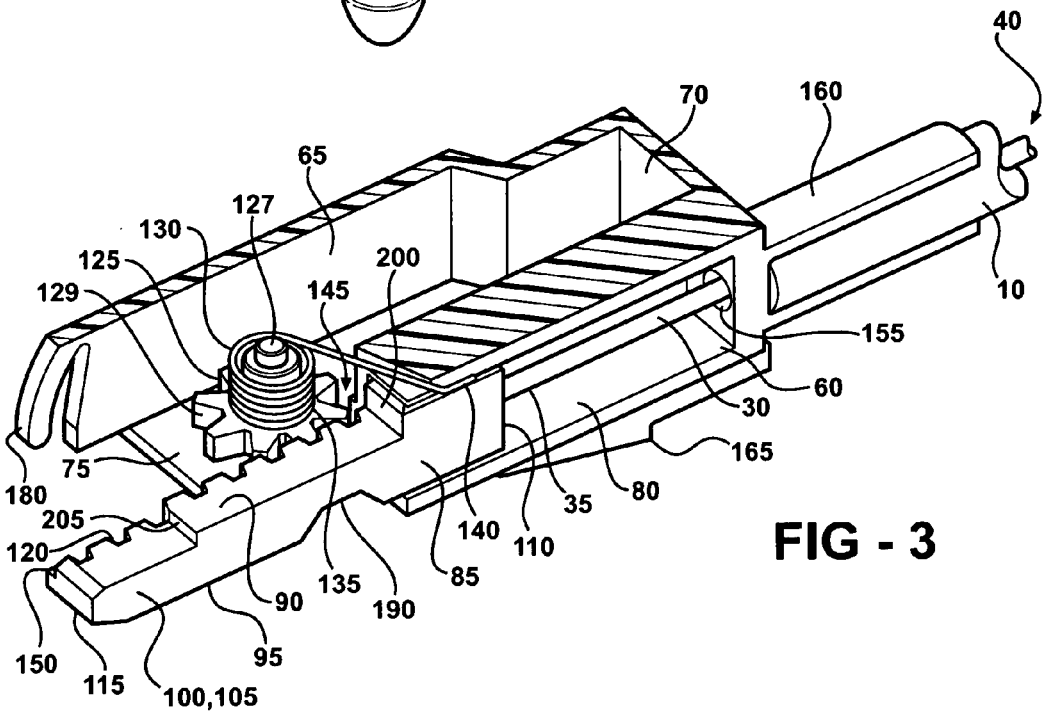
FIG. 3 is a perspective view with the top removed from the slide housing detailing the slide member, gear assembly, and torsion spring of the present invention.

Referring to FIG. 1, there is shown the motion transmitting remote control cable assembly 5 of the present invention. The motion transmitting remote control cable assembly 5 includes a conduit 10 having first and second ends 15, 20 and a central axis 25. A core wire 30 is disposed along the central axis 25 of the conduit 10 and also includes first and second ends 35, 40. A slide housing 45 having opposing top and bottom walls 50, 55, opposing side walls 60, 65, and opposing first and second ends 70, 75 includes a guide passage 80 extending from the first end 70 to the second end 75 of the slide housing 45. A slide member 85 having opposing top and bottom surfaces 90, 95, opposing side surfaces 100, 105, and opposing first and second ends 110, 115 is coupled to the core wire 30 at the first end 35 of the core wire 30. The slide member 85 is slidably disposed within the guide passage 80. The slide member 85 preferably includes notches 120 formed on one of the opposing side surfaces 100, 105, as best shown in FIGS. 2 and 3. A gear assembly 125 is rotatably connected to the slide housing 45 and meshed with the notches 120 formed on the slide member 85. A torsion spring 130, as best shown in FIG. 3, includes first and second ends 135, 140 disposed about the gear assembly 125 and attached to the gear assembly 125 at the first end of the spring 135. The torsion spring 130 is also attached to the slide housing 45 at the second end of the torsion spring 140 for applying a biasing force to the slide member 85.

Referring to FIGS. 2 and 3, the slide housing 45 is a hollow rectangular body having opposing top and bottom walls 50, 55, opposing side walls 60, 65, and opposing first and second ends 70, 75. In a preferred aspect, the second end 75 of the slide housing 45 is open allowing for movement of the slide member 85 that is disposed in the guide passage 80 formed in the slide housing 45. The guide passage 80 preferably includes a positioning slot 145 formed on the guide passage 80 for mating with a positioning ledge 150 formed on the slide member 85. In this manner, the slide member 85 is prevented from shifting during motion within the passage 80. Additionally, the slide passage 80 preferably includes a bore 155 formed through the first end 70 for allowing passage of the core wire 30. A cylindrical extension 160 is formed about the bore 155 and extends outward from the first end 70 to receive the first end 15 of the conduit 10.

The slide housing 45 includes a locking feature 165 formed on an exterior of the bottom wall 55 to couple the slide housing 45 to an ignition housing 170, as detailed in FIG. 1. The locking feature 165 preferably includes a flexible ramp structure that flexes to join a pocket 175 formed on a corresponding member, in this case the ignition housing 170. The slide housing 45 also includes a flexible extension 180 formed on the first end 70 that extends outward for abutting an end surface 185 of the ignition housing 170 to bias the locking feature 165 of the slide housing 45 into engagement with the retention pocket 175 of the ignition housing 170.

As stated above, the slide member 85 is disposed within the passage 80 formed in the slide housing 45. Additionally, the slide member 85 includes notches 120 formed on at least one of the side surfaces 100, 105 for engaging the gear assembly 125, as described above. In a preferred aspect, the slide member 85 is formed on the first end 35 of the core wire 30. By forming the slide member 85 onto the core wire 30, buttons or other attachment-type features normally associated with such slide members 85 are eliminated allowing for direct actuation of the core wire 30. The slide member 85 is preferably rectangular in shape and includes a retention pocket 190 formed on the bottom surface 95 of the slide member 85 for receiving a pin 195 associated with an ignition assembly, for preventing movement of the slide member 85 within the passage 80 formed in the slide housing 45.

As best shown in FIG. 3, the slide member 85 includes first and second step transitions 200, 205 formed on the top surface 90 of the slide member 85. Preferably, the first step transition 200 is utilized to align the notches 120 formed on the side surface 200 of the slide member 85 with the gear assembly 125. The second step transition 205 allows for passage of the slide member 85 into an ignition assembly when the slide housing 45 is inserted within the ignition housing 170.

The retention pocket 190 formed on the bottom surface 95 of the slide member 85 engages the pin 195 associated with the ignition housing 170, as shown in FIGS. 1 and 2, to prevent movement of the slide member 85 within the passage 80. This relationship prevents movement of a shift lever from the park position, unless the pin 195 is released from the retention pocket 190 allowing movement of the slide member 85 within the passage 80 formed in the slide housing 45.

As stated above, the gear assembly 125 is rotatably connected to the slide housing 45 and meshes with the notches 120 formed on the slide member 85. In a preferred aspect, the gear assembly 125 includes an integrally formed axle 127 and gear 129. The axle 127 preferably has a variable diameter for retaining the torsion spring 130 and positioning the gear 129 into meshing engagement with the notches 120 formed on the slide member 85. The differentiating or variable diameter allows a vertical dimension of the gear assembly 125 to be controlled such that the gear 129 meshes correctly with the notches 120 formed on the slide member 85.

As stated above, the torsion spring 130 is disposed about the axle 127 and is connected to the axle 127 at a first end 135 of the torsion spring 130. The second end 140 of the torsion spring 130 is disposed or connected with the slide housing 45 above the passage 80, as best seen in FIG. 3.

Referring to FIG. 1, the slide housing 45 preferably is positioned within an ignition housing 170. The ignition housing 170 preferably includes top and bottom surfaces 210, 215, opposing side surfaces 220, 225, and an end surface 185 connected to each other to define an ignition cavity 235. The ignition cavity 235 preferably includes retention pockets 175 formed therein to receive the locking feature 165 formed on the bottom surface 55 of the slide housing 85. Additionally, the ignition cavity 235 includes guide surfaces 245 formed thereon for mating with the slide housing 85 and properly locating the slide housing 85 within the ignition housing 170 such that the pin 195 is aligned with the retention pocket 190 formed on the bottom of the slide member 85.

In use, the slide member 85 is formed on the first end 35 of the core wire 30 and is inserted within the passage 80 formed in the slide housing 85. The notches 120 formed on the slide member 85 engage the gear assembly 125 and reversibly rotate the gear 129; thereby pretensioning the torsion spring 130 when the slide member 85 is inserted into the passage 80. The pretension of the torsion spring 130 allows for a tension to be maintained in the core wire 30; thereby eliminating vibrations and noise, as well as providing a returning action for the core wire 30. Once the slide member 85 has been inserted into the passage 80, the slide housing 45 may then be inserted within the ignition housing 170, as best shown in FIG. 1. The slide housing 45 is inserted into the ignition housing 170 such that the guide surfaces 245 of the ignition housing 170 engage the slide housing 45 and direct the slide housing 45 within the cavity 235 formed in the ignition housing 170. The slide housing 45 is inserted within the ignition housing 170 until the slide member 85 is positioned above the pin 195 of the ignition system such that the retention pocket 190 formed on the bottom of the slide member 85 is positioned over the pin 195. The pretensioning of the core wire 30 allows for the slide member 85 to extend and be positioned relative to the pin 195. The locking feature 165 formed on the exterior of the bottom wall 55 of the slide housing 45 is received within the pocket 175 formed in the ignition housing 170; thereby securely retaining the slide housing 45 within the ignition housing 170. The flexible extension 180 formed on the first end 70 of the slide housing 45 contacts the end surface 185 of the ignition housing 170 and biases the locking feature 165 of the slide housing 45 into secure engagement with the retention pocket 175 of the ignition housing 170. Additionally, the flexible extension 165 prevents vibration and rattle associated between the slide housing 45 and the ignition housing 170. The pin 195 of the ignition housing 170 is maintained in an up or first position wherein the pin 195 is securely within the retention pocket 190 of the slide member 85 preventing movement of the slide member 85 within the passage 80 of the slide housing 45. When a key is turned, the pin 195 drops down out of the retention pocket 190 allowing movement of the slide member 85 within the passage 80 to allow movement of the core wire 30 to shift the transmission from a park position to an alternate position.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A motion transmitting remote control cable assembly comprising:
   a conduit having first and second ends and a central axis;
   a core wire disposed along the central axis of the conduit and including first and second ends;
   a slide housing having opposing top and bottom walls, opposing side walls and opposing first and second ends, the slide housing including a guide passage extending from the first to the second end of the slide housing;
   a slide member having opposing top and bottom surfaces, opposing side surfaces and opposing first and second ends, the slide member coupled to the core wire at the first end of the core wire and slidably disposed within the guide passage, the slide member including notches formed on one of the opposing side surfaces;
   a gear assembly rotatably connected to the slide housing and meshed with the notches formed on the slide member;
   a spring disposed about the gear assembly and attached to the gear assembly and attached to the slide housing for applying a biasing force to the slide member wherein the top surface of the slide member includes a second stepped transition for allowing passage of the slide member into an ignition assembly.

2. The motion transmitting remote control cable assembly of claim 1 wherein the slide member includes a retention pocket formed on the bottom surface of the slide member for receiving a pin associated with an ignition assembly for preventing movement of the slide member within the passage formed in the slide housing.

3. The motion transmitting remote control cable assembly of claim 1 wherein the slide member is formed on the first end of the core wire.

4. The motion transmitting remote control cable assembly of claim 1 wherein the slide housing includes a bore formed through the first end for allowing passage of the core wire.

5. The motion transmitting remote control cable assembly of claim 4 wherein the slide housing includes a cylindrical extension formed about the bore and extending outward from the rear end for receiving a first end of the conduit.

6. The motion transmitting remote control cable assembly of claim 1 wherein the slide housing includes a positioning slot formed on the guide passage for mating with a positioning ledge formed on the slide member.

7. The motion transmitting remote control cable assembly of claim 1 wherein the slide housing includes a locking feature formed on an exterior of the bottom wall for coupling the slide housing to a hollow ignition housing.

8. The motion transmitting remote control cable assembly of claim 7 wherein the ignition housing includes opposing top and bottom surfaces, opposing side surfaces and an end surface connected to each other defining an ignition cavity.

9. The motion transmitting remote control cable assembly of claim 8 wherein the ignition cavity includes a retention pocket formed therein for receiving the locking feature formed on the slide housing.

10. The motion transmitting remote control cable assembly of claim 9 wherein the slide housing includes a flexible extension formed on the front end and extending outward for abutting the end surface of the ignition housing biasing the locking feature of the slide housing into engagement with the retention pocket of the ignition housing.

11. The motion transmitting remote control cable assembly of claim 8 wherein the ignition cavity includes guide surfaces formed thereon for mating with the slide housing.

12. The motion transmitting remote control cable assembly of claim 1 wherein the gear assembly includes an integrally formed axle and gear.

13. The motion transmitting remote control cable assembly of claim 12 wherein the axle has different diameters for retaining the spring and positioning the gear into meshing engagement with the notches formed on the slide member.

14. The motion transmitting remote control cable assembly of claim 1 wherein the top surface of the slide member includes a first stepped transition for aligning the notches formed on the side surface of the slide member with the gear assembly.

15. A motion transmitting remote control cable assembly comprising:
a conduit having first and second ends and a central axis;
a core wire disposed along the central axis of the conduit and including first and second ends;
a hollow ignition housing including opposing top and bottom surfaces, opposing side surfaces and an end surface connected to each other defining an ignition cavity;
a slide housing having opposing top and bottom walls, opposing side walls and opposing first and second ends, the slide housing including a guide passage extending from the first to the second end of the slide housing, the slide housing disposed in the ignition cavity; a slide member having opposing top and bottom surfaces, opposing side surfaces and opposing first and second ends, the slide member coupled to the core wire at the first end of the core wire and slidably disposed within the guide passage, the slide member including notches formed on one of the opposing side surfaces;
a gear assembly rotatably connected to the slide housing and meshed with the notches formed on the slide member;
a torsion spring having first and second ends disposed about the gear assembly and attached to the gear assembly at the first end of the spring and attached to the slide housing at the second end of the spring for applying a biasing force to the slide member.

16. A motion transmitting remote control cable assembly comprising:
a conduit having first and second ends and a central axis;
a core wire disposed along the central axis of the conduit;
a slide housing having opposing first and second ends, the slide housing including a guide passage extending from the first to the second end of the slide housing;
a slide member having opposing top and bottom surfaces and opposing side surfaces; the slide member coupled to the core wire at the first end of the core wire and slidably disposed within the guide passage, the slide member including notches formed on one of the opposing side surfaces;
a gear assembly rotatably connected to the slide housing and meshed with the notches formed on the slide member;
a torsion spring having first and second ends disposed about the gear assembly and attached to
the gear assembly at the first end of the spring and attached to the slide housing at the second end of the spring for applying a biasing force to the slide member;
the slide member including a retention slot formed on the bottom surface of the slide member for receiving a pin associated with an ignition assembly for preventing movement of the slide member within the passage formed in the slide housing.

* * * * *